United States Patent
Martin et al.

(10) Patent No.: US 11,550,392 B2
(45) Date of Patent: Jan. 10, 2023

(54) SIGNAL COMBINATION OF PHYSIOLOGICAL SENSOR SIGNALS

(71) Applicant: Hewlett-Packard Development Company, L.P., Spring, TX (US)

(72) Inventors: Robert Paul Martin, Fort Collins, CO (US); Joseph Nouri, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/414,351

(22) PCT Filed: May 20, 2019

(86) PCT No.: PCT/US2019/033082
§ 371 (c)(1),
(2) Date: Jun. 16, 2021

(87) PCT Pub. No.: WO2020/236147
PCT Pub. Date: Nov. 26, 2020

(65) Prior Publication Data
US 2022/0066555 A1    Mar. 3, 2022

(51) Int. Cl.
*G06F 3/01*     (2006.01)
*A63F 13/212*   (2014.01)
*A63F 13/25*    (2014.01)

(52) U.S. Cl.
CPC ............ *G06F 3/015* (2013.01); *A63F 13/212* (2014.09); *A63F 13/25* (2014.09)

(58) Field of Classification Search
CPC ................. G06F 3/011–015; A63F 13/212
See application file for complete search history.

(56) References Cited

U.S. PATENT DOCUMENTS

| | | | |
|---|---|---|---|
| 8,473,045 B2 | 6/2013 | Terada et al. | |
| 9,934,634 B1 | 4/2018 | Mullin et al. | |
| 2007/0173733 A1* | 7/2007 | Le ............................ | A61B 5/16 600/544 |
| 2012/0149467 A1 | 6/2012 | Heck | |
| 2012/0262558 A1* | 10/2012 | Boger ................ | G02B 27/0093 348/61 |
| 2012/0313802 A1* | 12/2012 | Vigoda ................... | H03M 1/20 341/155 |
| 2016/0341959 A1 | 11/2016 | Gibbs et al. | |

(Continued)

FOREIGN PATENT DOCUMENTS

| | | |
|---|---|---|
| KR | 101633057 B1 | 6/2016 |
| KR | 101788709 B1 | 10/2017 |

(Continued)

OTHER PUBLICATIONS

Wikipedia, Lateral inhibition last edited Mar. 2, 2019 (4 pages).

*Primary Examiner* — Hang Lin
(74) *Attorney, Agent, or Firm* — Quarles & Brady LLP

(57) ABSTRACT

In some examples, a facial gasket device includes a plurality of physiological sensors to detect physiological signals, and a signal processor to receive output signals based on measurements of the plurality of physiological sensors, the signal processor programmable to selectively combine a collection of the output signals to detect a target physiological activity of the user.

20 Claims, 4 Drawing Sheets

(56) References Cited

U.S. PATENT DOCUMENTS

| | | |
|---|---|---|
| 2017/0168568 A1 | 6/2017 | Petrov |
| 2017/0259167 A1 | 9/2017 | Cook et al. |
| 2017/0364153 A1 | 12/2017 | Kazansky et al. |
| 2018/0065017 A1* | 3/2018 | Murdock ............... A61B 5/744 |
| 2018/0253196 A1 | 9/2018 | Hu et al. |
| 2020/0233220 A1* | 7/2020 | Strongwater ........... G06F 3/012 |

FOREIGN PATENT DOCUMENTS

| | | |
|---|---|---|
| KR | 20180055743 A | 5/2018 |
| WO | WO-2018093181 A1 | 5/2018 |
| WO | WO-2018154341 A1 | 8/2018 |

* cited by examiner

SIGNAL COMBINATION OF PHYSIOLOGICAL SENSOR SIGNALS

BACKGROUND

Users can wear head-mounted devices to perform online interactions over a network. The online interactions can include online gaming sessions, virtual reality sessions, extended reality sessions, and so forth.

BRIEF DESCRIPTION OF THE DRAWINGS

Some implementations of the present disclosure are described with respect to the following figures.

Figure 1:
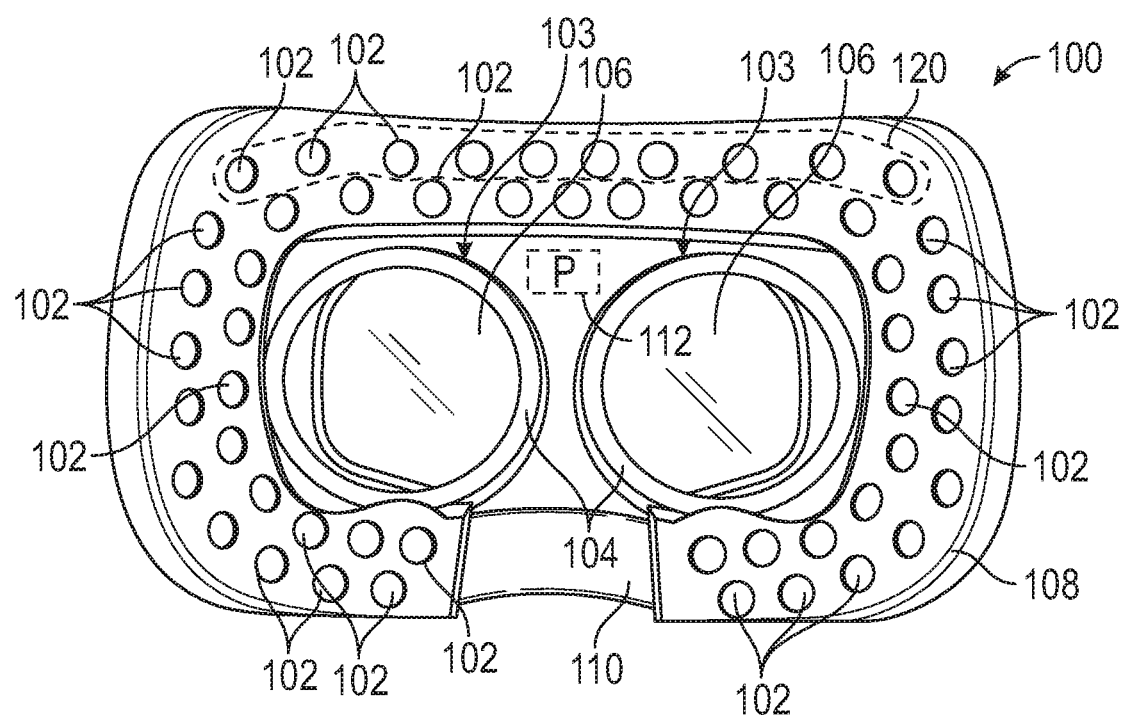
FIG. 1 is a rear view of a facial gasket device including physiological sensors according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Users wearing head-mounted devices can collaborate with one another in online sessions, such as online gaming sessions, virtual reality sessions (in which virtual reality images are presented), extended reality sessions (in which virtual reality images are augmented with images of real-world objects), and so forth. As used here, an "image" can refer to a still image or video images captured using a camera or multiple cameras.

During collaborations in online sessions, users may communicate with one another verbally or by exchanging textual or graphical information. In direct (face-to-face) communications, non-verbal cues can be exchanged between users since they are able to see each other's faces. Such non-verbal cues include information based on facial expressions. Facial expressions are not visible to users that interact with head-mounted devices in online sessions in which facial images of the users are not available. Because of the loss of non-verbal cues, misinterpretation of messages or other issues can result.

In accordance with some implementations of the present disclosure, FIG. 1 shows a facial gasket device 100 that includes a pattern of physiological sensors 102. Each physiological sensor 102 is represented as a circle in FIG. 1, although the physiological sensor 102 can have any other shape in other examples. Not all of the physiological sensors are labeled with the reference numeral 102 to avoid cluttering the figure.

Although discrete physiological sensors 102 are shown in FIG. 1, it is noted that in other examples, larger physiological sensors that cover a larger area can be used. In yet other examples, smaller physiological sensors that cover a smaller area can be used. In yet other examples sensors may be located on other positions of the device or external to the device. For example, a head accessory may attach to a head-mounted device to allow for sensors to be placed on the scalp of a user.

A facial gasket device refers to any device on which a portion of the device when in use is contacted to the face of a user. The facial gasket device can be part of a larger head-mounted device, or alternatively, the facial gasket device can be in the form of a mask that is worn over the user's eyes.

Although some examples refer to physiological sensors on a facial gasket device, it is noted that in further examples, a device may include additional physiological sensors positioned to detect other parts of a human. For example, the device may further include a body suit with sensors, a vest with sensors, a glove with sensors, footwear with sensors, and so forth.

In the example of FIG. 1, the facial gasket device 100 is in the form of a mask. The facial gasket device 100 includes eye portions 103 that are in front of the user's eyes when the facial gasket device 100 is worn on the user's face. The eye portions 103 include openings 104 in which display screens 106 can be mounted. The display screens 106 can include separate display devices in the respective different openings 104. Alternatively, one display device can extend across the width of the facial gasket device 100 to cover both the openings 104. In the latter examples, the display screens 106 are different segments of the one display device.

The display screens 106 can be transparent or semi-transparent, in some examples, such that a user can view the outside world even when wearing the facial gasket device 100. The display screens 106 can additionally display images such as virtual reality images. The virtual reality images augmented with real-world images provide an extended reality environment.

The physiological sensors 102 are arranged around a peripheral portion 108 of the facial gasket device 100. The peripheral portion 108 is provided on the inner surface of the facial gasket device 100. The inner surface of the facial gasket device 100 is the surface that touches the face of a user when the facial gasket device 100 is worn by the user. The peripheral portion 108 surrounds (at least partially) the eye portions 103 of the facial gasket device 100. A gap 110 in the peripheral portion 108 provides a space for a user's nose when the facial gasket device 100 is worn by the user.

The physiological sensors 102 shown in FIG. 1 measure physiological signals associated with the face of the user. More generally, physiological sensors can measure physiological signals associated with any body part of a user. A "physiological signal" refers to a signal that is dependent upon a function of a human face, another part of the user's head, or any other body part (e.g., hand, foot, chest, etc.) of the user. Examples of physiological signals are provided further below.

The facial gasket device 100 includes a signal processor 112 to receive measured physiological signals from the physiological sensors 102. The signal processor 112 is shown in dashed profile in FIG. 1 since the signal processor 112 is embedded within an external housing of the facial gasket device 100. The signal processor 112 processes the measured physiological signals and provides an indication of facial expressions, muscle movement, emotional states, cognitive states, physiological conditions, and/or other target physiological activities that can be derived from the physiological signals.

The signal processor 112 can be implemented with a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, the signal processor 112 can be implemented using a combination of a hardware processing circuit and machine-readable instructions (software and/or firmware) executable on the hardware processing circuit.

The signal processor 112 is programmable to selectively combine a collection of output signals from the physiological sensors 102. The "collection" of the output signals from the physiological sensors 102 can refer to a subset of the output signals from the physiological sensors 102, where the subset can include just a single signal from a single physiological sensor 102, or multiple output signals from multiple physiological sensors 102. The subset of the output signals from the physiological sensors 102 can refer to less than all of the output signals from the physiological sensors 102, or alternatively, to all of the output signals from the physiological sensors 102.

Different collections of output signals from physiological signals 102 can include a first collection of output signals from a first subset of physiological sensors 102 and a second collection of output signals from a second subset of physiological sensors 102, where the first and second collections differ in at least one output signal (in other words, an output signal from a particular physiological sensor 102 is included in the first collection that is not included in the second collection, or vice versa).

The ability to programmatically combine different collections of the output signals based on measurements of the physiological sensors 102 allows for enhanced flexibility, which can allow the facial gasket device 100 to be used with different users that may have different sized and shaped faces. Each collection of physiological signals from the physiological sensors 102 forms a respective virtual sensor. The "virtual sensor" refers to a sensor that includes a selected combination of physiological sensors 102.

The physiological sensors 102 may not align with a person's face or other body part, and so the use of selected collection(s) of physiological sensors 102 to form respective virtual sensors allows for a device with physiological sensors to adapt to a shape of a specific user's face or other body part. Additionally, the ability to programmatically combine different collections of the output signals based on measurements of the physiological sensors 102 also allows for different combinations of the physiological sensors 102 at different locations of the facial gasket device 100 to be applied for different use cases.

In some examples, some physiological sensors 102 are able to detect electromyographic (EMG) signals, which are signals produced by enervation of muscles on the user's face. As facial muscles contract, the facial muscles can produce electrical signals that can be detected as EMG signals by some physiological sensors 102.

In further or alternative examples, some physiological sensors 102 can detect electroencephalographic (EEG) signals, which are signals associated with electrical activity in a user's brain. In further examples, some physiological sensors can detect electrooculography (EOG) signals, which measure electrical signals due to cornea-retinal activity in the user's eyes. As further examples, some physiological sensors 102 can detect magnetoencephalography (MEG) signals, which are magnetic field signals produced by electrical currents occurring in the user's brain. As further examples, some physiological sensors 102 can detect galvanic skin response (GSR) signals, which are based on changes in sweat gland activity on the user's face that can be reflective of the intensity of the user's emotional state or other physiological activity. In other examples, further physiological sensors 102 can detect any or some combination of heart rates, blood pressure, blood flow pulse rate, respiration rate, body temperature, and so forth.

The foregoing provides the following examples of physiological signals that can be measured by the physiological sensors 102: EMG signals, EEG signals, EOG signals, MEG signals, GSR signals, and signals to represent any or some combination of heart rates, blood pressure, blood flow pulse rate, respiration rate, body temperature, and so forth.

In other examples, other physiological sensors 102 for detecting other facial responses or other activity of the user's head or body can be employed. Generally, the physiological sensors 102 can include any or some combination of the following: skin electrodes contacted to the skin of the user's face, capacitive sensors, inductive sensors, magnetic field sensors, and so forth.

As used herein, type-A (or first type) physiological sensors can include sensors to measure any or some combination of EMG signals, EEG signals, EOG signals, and MEG signals.

As used herein, type-B (or second type) physiological sensors can include sensors to measure GSR signals.

As used herein, type-C (or third type) physiological sensors can include sensors to measure any or some combination of heart rates, blood pressure, blood flow pulse rate, respiration rate, body temperature, and so forth.

In accordance with some implementations, a virtual sensor can include any selected combination of any of the foregoing types of physiological sensors.

Figure 2:
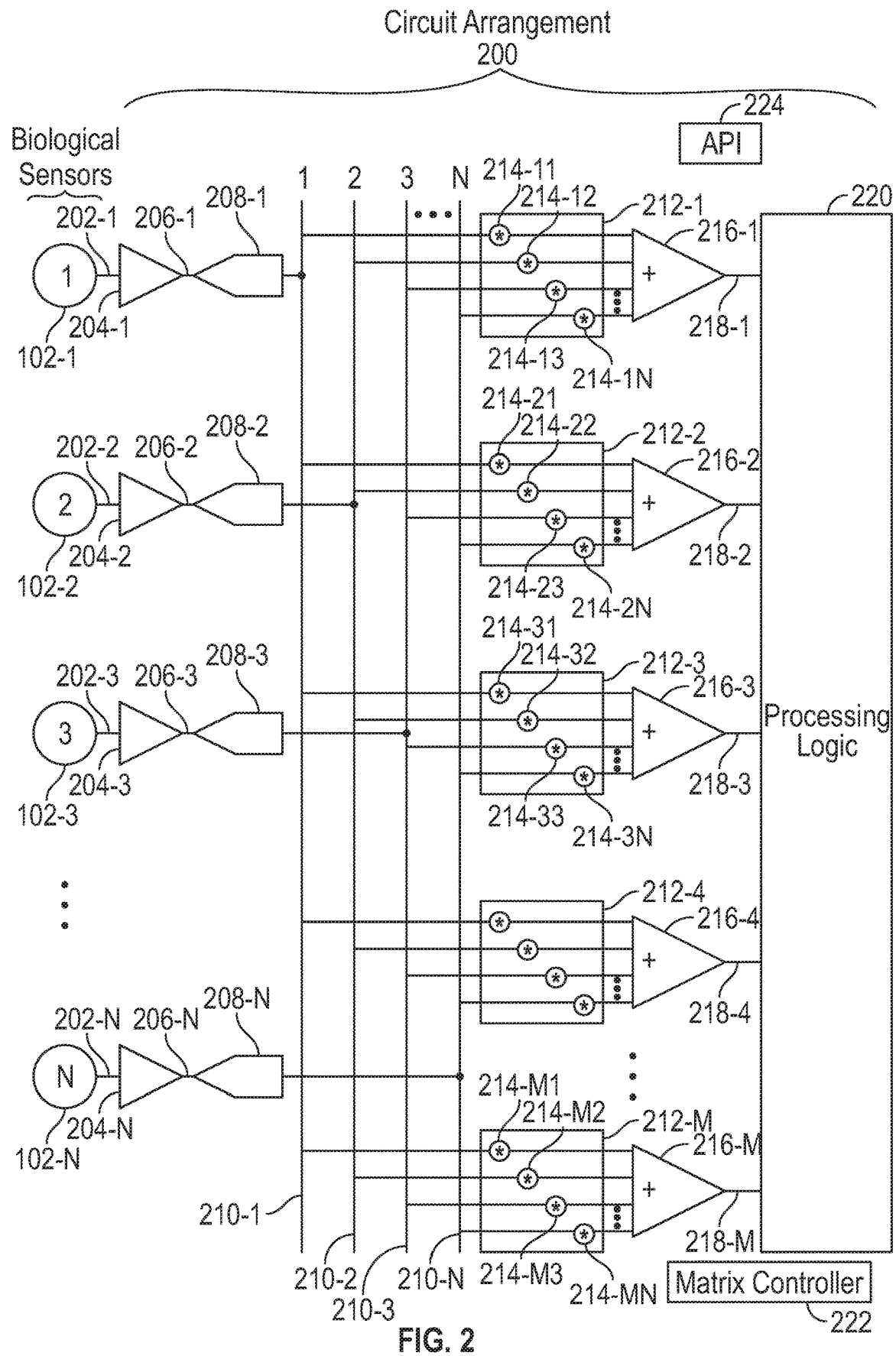
FIG. 2 is a schematic diagram of signal processing circuitry according to some examples.

FIG. 2 is a schematic diagram that shows an example circuit arrangement 200 that receives as input output signals 202-1 to 202-N (N≥2) from corresponding physiological sensors 102-1 to 102-N. The physiological sensors 102-1 to 102-N can be part of the physiological sensors at 102 shown in FIG. 1 or any other physiological sensors placed on any body part of a user.

The circuit arrangement 200 of FIG. 2 can be implemented as a combination of hardware and machine-readable instructions. In other examples, different circuit arrangements can be used.

Each output signal 202-$i$ ($i$=1 to N) can be provided to a respective signal conditioning block 204-$i$. In FIG. 2, signal conditioning blocks 204-1 to 204-N receive respective output signals 202-1 to 202-N from the physiological sensors 102-1 to 102-N. Each signal conditioning block 204-$i$ can apply a signal gain on the output signal 202-$i$, such as by performing signal amplification. In addition, the signal conditioning block 204-$i$ can apply filtering on the output signal 202-$i$, such as low pass filtering, high pass filtering, or any other type of filtering. The filtering can be performed to reduce noise or for any other purpose.

The signal conditioning applied by each signal conditioning block 204-$i$ can improve the signal-to-noise ratio of the output signal from the respective physiological sensor 102-$i$. In other examples, the signal conditioning block 204-$i$ can apply just signal gain or just signal filtering. In further examples, the signal conditioning blocks 204-1 to 204-N can be omitted.

The signal conditioning block 204-$i$ produces a conditioned signal 206-$i$ based on the respective output signal 202-$i$ from the respective physiological sensor 102-$i$. In the example of FIG. 2, the signal conditioning blocks 204-1 to 204-N produce respective conditioned signals 206-1 to 206-N.

Each conditioned signal 206-$i$ is provided to the input of an analog-to-digital converter (ADC) 208-$i$. ADCs 208-1 to 208-N are shown in FIG. 2, which receive analog conditioned signals 206-1 to 206-N, respectively.

Each ADC 208-$i$ converts the respective analog conditioned signal 206-$i$ to a digital signal provided onto a respective digital signal bus 210-$i$. Thus, in the example of FIG. 2, the digital signal from the ADC 208-1 is provided onto the digital signal bus 210-1, the digital signal from the ADC 208-2 is provided onto the digital signal bus 210-2, and so forth. More generally, the digital signal from the ADC 208-$i$ is provided onto digital bus 210-$i$.

The analog conditioned signal 206-$i$ from the respective signal conditioning block 204-$i$ has an amplitude or other characteristic that is representative of a physiological characteristic (e.g., muscle enervation, brain activity, etc.) of a user. A digital signal produced by the ADC 208-$i$ from the analog conditioned signal 206-$i$ has a value (represented with a single bit or multiple bits) that corresponds to the amplitude or other characteristic of the analog conditioned signal 206-$i$. Each digital signal bus 210-$i$ has a width dependent upon the number of bits used to represent the value from the ADC 208-$i$.

In FIG. 2, M (M≥2) signal selection blocks 212-1 to 212-M can select different combinations of output signals 202-1 to 202-N from the physiological sensors 102-1 to 102-N. Each signal selection block 212-$j$ (j=1 to M) includes N signal selectors. For example, the signal selection block 212-1 includes N signal selectors 214-11 to 214-1N. Similarly, the signal selection block 212-2 includes N signal selectors 214-21 to 214-2N, and the signal selection block 212-M includes N signal selectors 214-M1 to 214-MN.

Each of the signal selectors 214-11, 214-21, ..., 214-M1 is connected to the digital signal bus 210-1, each of the signal selectors 214-12, 214-22, ..., 214-M2 is connected to the digital signal bus 210-2, and each of the signal selectors 214-1N, 214-2N, ..., 214-MN is connected to the digital signal bus 210-N.

A signal selector 214-$ji$ (j=1 to M, i=1 to N) is part of signal selection block 212-$j$, and is connected to digital signal bus 210-$i$.

A signal selector 214-$ji$ can be selectively programmed to apply different gains to the digital signal on the corresponding digital signal bus 210-$i$. The gains that can be applied include a positive gain, a zero gain, or a negative gain. For example, a positive gain applied on the digital signal on the digital signal bus 210-$i$ keeps the digital signal at the same polarity. A negative gain applied on the digital signal on the digital signal bus 210-$i$ flips the polarity of the digital signal (e.g., if the digital signal represents a certain value, then the negative gain applied to the digital signal produces a negative of that value). A zero gain provided by the signal selector 214-$ji$ effectively deselects the corresponding digital signal on the digital signal bus 210-$i$, by the signal selection block 212-$j$.

The outputs from the signal selectors 214-$j$1 to 214-$j$N of the signal selection block 212-$j$ are provided to inputs of a respective combination block 216-$j$. In the example of FIG. 2, the signal selection block 212-1 provides outputs from its signal selectors 214-11 to 214-1N to the inputs of the combination block 216-1, and the signal selection block 212-M provides outputs from its signal selectors 214-M1 to 214-MN to the inputs of the combination block 216-M.

In some examples, each combination block 216-$j$ sums the input signals received from the corresponding signal selection block 212-$j$. Summing signals can refer to mathematically adding the signals together. Any input signal subjected to a zero gain by a corresponding signal selector has a zero value, and thus does not contribute to the value of the summed output of the combination block 216-$j$.

In other examples, instead of summing the input signals, the combination block 216-$j$ can perform another type of combination, such as by computing a product of its inputs, computing an average of its inputs, computing a medium of its inputs, computing a maximum of its inputs, computing a minimum of its inputs, and so forth.

Each combination block 216-$j$ outputs a combined signal 218-$j$. In the example, the combination blocks 216-1 to 216-M output respective combined signals 218-1 to 218-M. The combined signals 218-1 to 218-M are provided to a processing logic 220. The processing logic 220 can determine, based on the combined signals 218-1 to 218-M, an indication of a facial cue, an emotional state, or other characteristic of the user on which the facial gasket device 100 is worn. The processing logic 220 can be programmed to make a determination of a user's state (facial cue, emotional state, etc.) based on any or a collection of the combined signals 218-1 to 218-M. In other examples, the processing logic 220 can implement machine learning to produce indications of a user's state.

FIG. 2 also shows a matrix controller 222, which can set the gains of the respective signal selectors of the signal selection blocks 212-1 to 212-M. The matrix controller 222 can set the gains of the signal selectors based on user input, based on application of a machine learning process, or using any other type of technique.

In some examples, the combination of the processing logic 220, the combination blocks 216-1 to 216-M, and the signal selection blocks 212-1 to 212-M can be part of the signal processor 112 of FIG. 1.

Additionally, the matrix controller 222 can also be part of the signal processor 112 of FIG. 1. Alternatively, the matrix controller 222 can be separate from the signal processor 112. If separate, the matrix controller 222 can be implemented as a hardware processing circuit or as a combination of a hardware processing circuit and machine-readable instructions executable on the hardware processing circuit.

By using techniques or mechanisms according to some implementations of the present disclosure, dynamic virtual sensors can be provided, in which physiological sensors 102 at target locations can be selected, and the signals from the selected physiological sensors 102 are combined using the circuit arrangement 200 to produce a signal as if acquired by a physiological sensor (or group of physiological sensors) at the target locations.

For example, to capture eyebrow movement, a cluster of EMG electrodes above the eyebrow may be selected, where these electrodes are in contact with a muscle group responsible for lifting the eyebrow. As an example, a collection of physiological sensors 102 within a dotted profile 120 can be considered a virtual sensor for capturing eyebrow movement. The output signals from these physiological sensors can be used to detect the lifting of an eyebrow, for example, and the processing logic 220 can make a determination of an emotional state or facial queue based on the lifting of the eyebrow (e.g., the processing logic 220 can indicate that the user is surprised, the user is concerned, etc.).

In addition, by being able to select physiological sensors 102 to use, the extent (e.g., radius or area) covered by the dynamic virtual sensor can be adjusted, to be smaller or larger. Also, the ability to select physiological sensors 102 to use can adjust a shape of the region to be covered by the dynamic virtual sensor.

The ability to select different physiological sensors 102 at different locations may also be beneficial in cases where some physiological sensors are experiencing higher noise levels than other physiological sensors. Physiological sensors with the higher noise levels can be de-selected, while physiological sensors with lower noise levels can be selected for combining their output signals.

More generally, by using the signal selectors in FIG. 2, physiological sensors at different locations can be selectively selected to be combined by a respective combination block 216-*j* to pick physiological sensors 102 at target locations.

Examples of use cases include a fully dynamic use case in which the virtual sensor placement can be adaptively adjusted in real time to capture signals from different regions of the face and/or other body parts. For example, an application may want to adjust the virtual electrode placement during a training session for an individual user, such as to capture information about a specific muscle group in the face and/or other body part.

Another use case is a slippage use case, to compensate for slippage of the facial gasket device 100 or other device when worn by a user. If the facial gasket device 100 or other device were to slip or move during use, such movement can be compensated by shifting the virtual sensor placement opposite the motion of the facial gasket device 100 or other device on the face or other body part. The motion of the facial gasket device 100 or other device can be detected based on use of motion sensors, such as a gyroscope and/or an accelerometer, on the facial gasket device 100 or other device.

FIG. 2 further shows that the circuit arrangement 200 includes an application programming interface (API) 224. The API 224 can include routines that can be invoked by an external entity (e.g., an external computing device) to access content or functions of the facial gasket device 100. For example, the external computing device can access the API 224 (over a wired or wireless network) to access the combined signals 218-1 to 218-M, for example, or other information in the facial gasket device 100.

Figure 3:
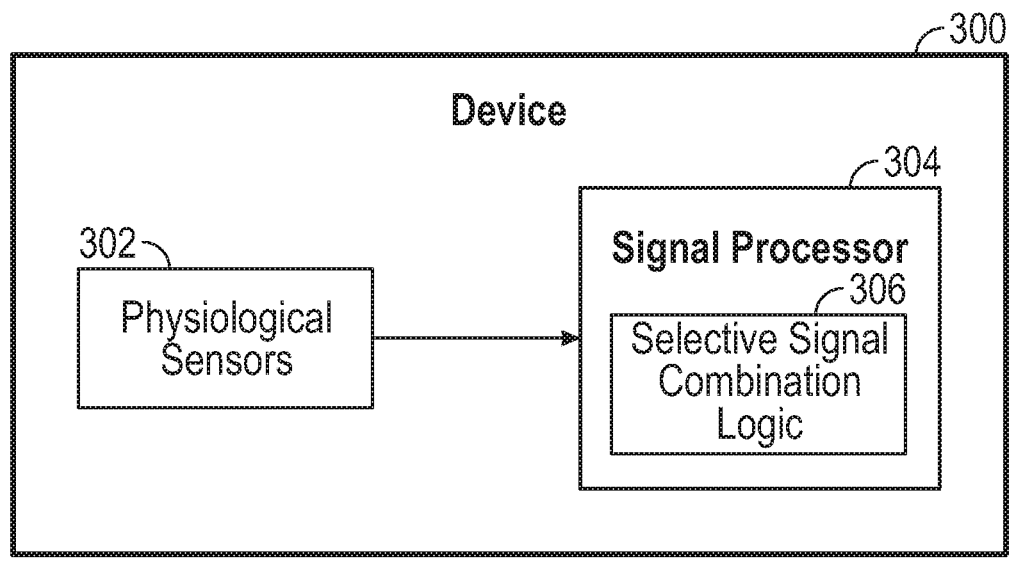
FIG. 3 is a block diagram of a facial gasket device according to some examples.

FIG. 3 is a block diagram of a device 300 according to some examples. The device 300 can include a facial gasket device, a body suit, a glove, a footwear, a vest, and so forth. The device 300 includes physiological sensors 302 to detect physiological signals associated with a body part of a user. The physiological sensors are arranged in a pattern to contact the face or other body part of the user.

The facial gasket device 300 further includes a signal processor 304 (e.g., the signal processor 112 of FIG. 1) to receive output signals based on measurements of the physiological sensors 302. The signal processor 304 is programmable to selectively combine a collection of the output signals to detect a target physiological activity of the user, where the collection of the output signals corresponds to a selected subset of the physiological sensors that form a virtual sensor.

For example, the signal processor 304 includes a selective signal combination logic 306 programmable to selectively combine different collections of the output signals for different shapes of faces. In further examples, the selective combination of the collection of output signals is to target a region of the face (so that a target physiological activity of the user can be determined based on the targeted region of the face) or filter out the region of the face (so that the filtered out region of the face is not considered in determining the target physiological activity of the user).

In some examples, the signal processor 304 includes a summing logic or other combination logic (e.g., 212-*j* and 216-*j*) to receive the output signals from the physiological sensors. The signal processor 304 can also include programmable gain logic (e.g., the signal selectors 214-*ji* of FIG. 2) to selectively set programmable gains of output signals to control a manner in which the output signals are combined.

Figure 4:
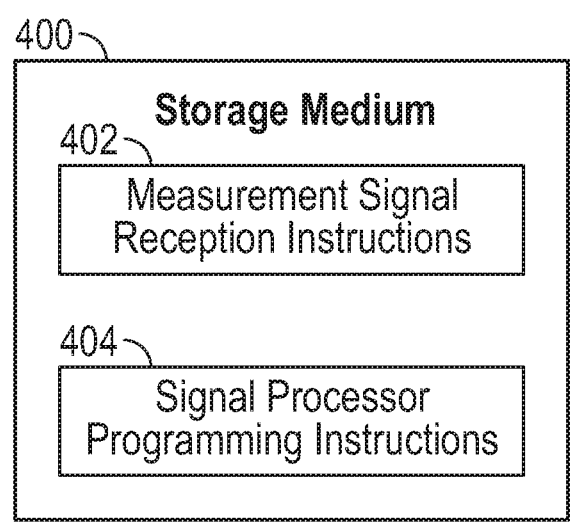
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a device (e.g., a facial gasket device, a body suit, a glove, a footwear, a vest, and so forth) to perform various tasks.

The machine-readable instructions include measurement signal reception instructions 402 to receive output signals based on measurements of a plurality of physiological sensors arranged in a pattern on the device.

The machine-readable instructions further include signal processor programming instructions 404 to program a signal processor to selectively combine a collection of the output signals for forming a virtual sensor to detect a target physiological activity of the user.

Figure 5:
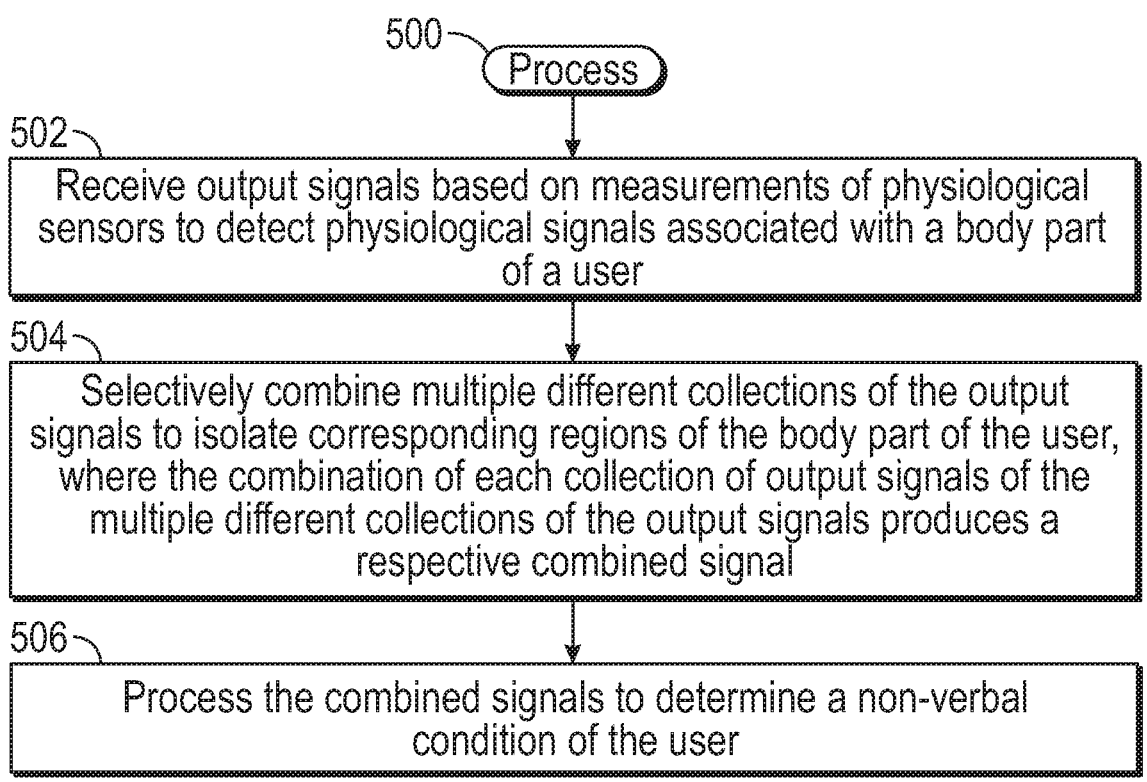
FIG. 5 is a flow diagram of a process according to some examples.

FIG. 5 is a flow diagram of a process 500, which can be performed by a signal processor (e.g., 100 in FIG. 1 or 304 in FIG. 3).

The process 500 includes receiving (at 502) output signals based on measurements of physiological sensors to detect physiological signals associated with a body part of a user.

The process 500 selectively combines (at 504) multiple different collections of the output signals to isolate corresponding regions of the body part of the user, where the combination of each collection of output signals of the multiple different collections of the output signals produces a respective combined signal.

The process 500 further processes (at 506) the combined signals to determine a non-verbal condition (e.g., facial cue or other condition) of the user.

A non-transitory storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device comprising:
a plurality of physiological sensors to detect physiological signals associated with a body part of a user; and
a signal processor to receive output signals based on measurements of the plurality of physiological sensors, the signal processor comprising a plurality of signal selection blocks programmable to selectively combine respective collections of the output signals to detect target physiological activities of the user, wherein the plurality of signal selection blocks comprises:
a first signal selection block receiving as input the output signals, the first signal selection block programmable to select a first subset of the output signals that corresponds to a selected first subset of the plurality of physiological sensors, wherein physiological sensors of the selected first subset form a first virtual sensor, and
a second signal selection block receiving as input the output signals, the second signal selection block programmable to select a different second subset of the output signals that corresponds to a selected second subset of the plurality of physiological sensors, wherein physiological sensors of the selected second subset form a second virtual sensor different from the first virtual sensor,
wherein the signal processor further comprises:
a first signal combiner to combine output signals of the first subset to produce a first combined signal,
a second signal combiner to combine output signals of the second subset to produce a second combined signal, and
wherein the signal processor is to process the first and second combined signals to provide an indication of a state of the user.

2. The device of claim 1, wherein the plurality of physiological sensors comprise sensors to output any or a combination of: electromyography (EMG) signals, electrooculography (EOG) signals, electroencephalographic (EEG) signals, and magnetoencephalogram (MEG) signals.

3. The device of claim 1, wherein the plurality of physiological sensors comprise sensors to output galvanic skin response (GSR) signals.

4. The device of claim 1, wherein the plurality of physiological sensors comprise sensors to detect any or some combination of a heart rate, a blood pressure, a blood flow pulse rate, a respiration rate, and a body temperature.

5. The device of claim 1, wherein the plurality of physiological sensors are arranged in a pattern to contact the body part of the user.

6. The device of claim 1, wherein the signal processor is programmable to selectively combine different collections of the output signals for different shapes of body parts.

7. The device of claim 1, wherein the selective combination of the respective collections of the output signals is to target a region of the body part or filter out the region of the body part.

8. The device of claim 1, wherein the selective combination of the respective collections of the output signals is to adjust an extent or shape of physiological sensors to use.

9. The device of claim 1, wherein the signal processor comprises:
programmable gain logic to selectively set programmable gains of the output signals to control a manner in which the output signals are combined.

10. The device of claim 9, wherein the programmable gain logic is to set the programmable gains according to machine learning.

11. The device of claim 1, further comprising filters to filter sensor signals output by the plurality of physiological sensors, to produce filtered signals, wherein the output signals are based on the filtered signals.

12. The device of claim 1, wherein the signal processor is to process the first and second combined signals to provide an indication of a facial cue or an emotional state of the user.

13. The device of claim 1, wherein the first signal selection block is programmable to select the first subset of the output signals by deselecting a first output signal of the output signals and selecting a second output signal of the output signals, and
wherein the second signal selection block is programmable to select the second subset of the output signals by deselecting the second output signal.

14. The device of claim 1, wherein the first subset of the output signals is for detecting eyebrow movement of the user.

15. The device of claim 1, wherein the signal processor is to:
detect a movement of the device relative to the body part of the user, and
program the first signal selection block to select a different subset of the output signals in response to detecting the movement of the device relative to the body part of the user.

16. The device of claim 15, wherein the movement of the device relative to the body part of the user comprises a movement of the device relative to a face of the user.

17. A non-transitory machine-readable storage medium comprising instructions that upon execution cause a device to:
receive output signals based on measurements of a plurality of physiological sensors arranged in a pattern on the device; and
program a signal processor to selectively combine respective collections of the output signals to detect target physiological activities of a user, wherein the signal processor comprises a plurality of signal selection blocks that comprise:
a first signal selection block receiving as input the output signals, the first signal selection block programmable to select a first subset of the output signals that corresponds to a selected first subset of the plurality of physiological sensors, wherein physiological sensors of the selected first subset form a first virtual sensor, and
a second signal selection block receiving as input the output signals, the second signal selection block programmable to select a different second subset of the output signals that corresponds to a selected second subset of the plurality of physiological sensors, wherein physiological sensors of the selected second subset form a second virtual sensor different from the first virtual sensor;
combine, using a first signal combiner of the signal processor, output signals of the first subset to produce a first combined signal;

combine, using a second signal combiner of the signal processor, output signals of the second subset to produce a second combined signal; and process, by the signal processor, the first and second combined signals to provide an indication of a state of the user.

18. The non-transitory machine-readable storage medium of claim 17, wherein the processing of the first and second combined signals provides an indication of a facial cue or an emotional state of the user.

19. The non-transitory machine-readable storage medium of claim 17, wherein the instructions upon execution cause the device to:

use the signal processor to detect a movement of the device relative to a body part of the user; and program the first signal selection block to select a different subset of the output signals in response to detecting the movement of the device relative to the body part of the user.

20. A method comprising:

receiving, by a signal processor, output signals based on measurements of a plurality of physiological sensors to detect physiological signals associated with a body part of a user;

selectively combining, by the signal processor, respective collections of the output signals to isolate corresponding regions of the body part of the user, wherein the signal processor comprises a plurality of signal selection blocks that comprise:

a first signal selection block receiving as input the output signals, the first signal selection block programmable to select a first subset of the output signals that corresponds to a selected first subset of the plurality of physiological sensors, wherein physiological sensors of the selected first subset form a first virtual sensor, and a second signal selection block receiving as input the output signals, the second signal selection block programmable to select a different second subset of the output signals that corresponds to a selected second subset of the plurality of physiological sensors, wherein physiological sensors of the selected second subset form a second virtual sensor different from the first virtual sensor;

combining, using a first signal combiner of the signal processor, output signals of the first subset to produce a first combined signal;

combining, using a second signal combiner of the signal processor, output signals of the second subset to produce a second combined signal; and processing, by the signal processor the first and second combined signals to determine a non-verbal condition of the user.

* * * * *